Patented Dec. 9, 1952

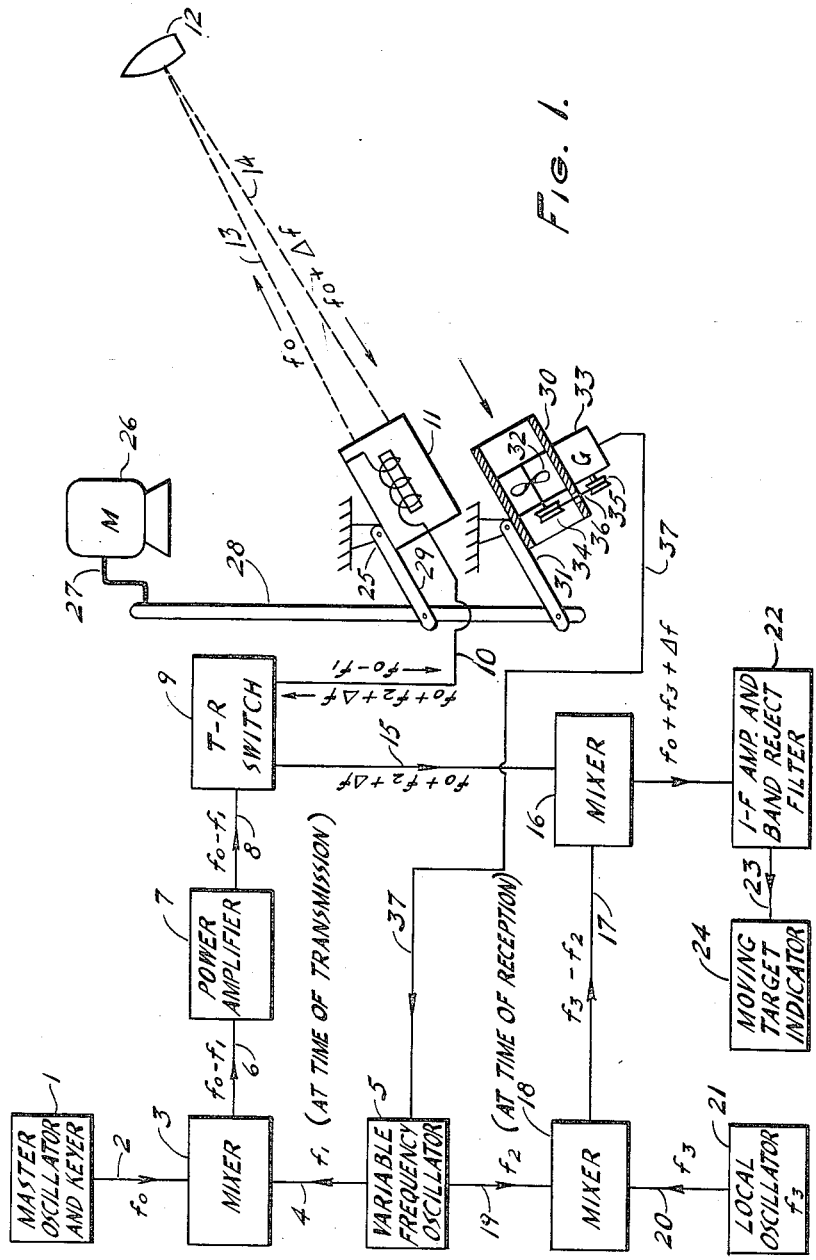

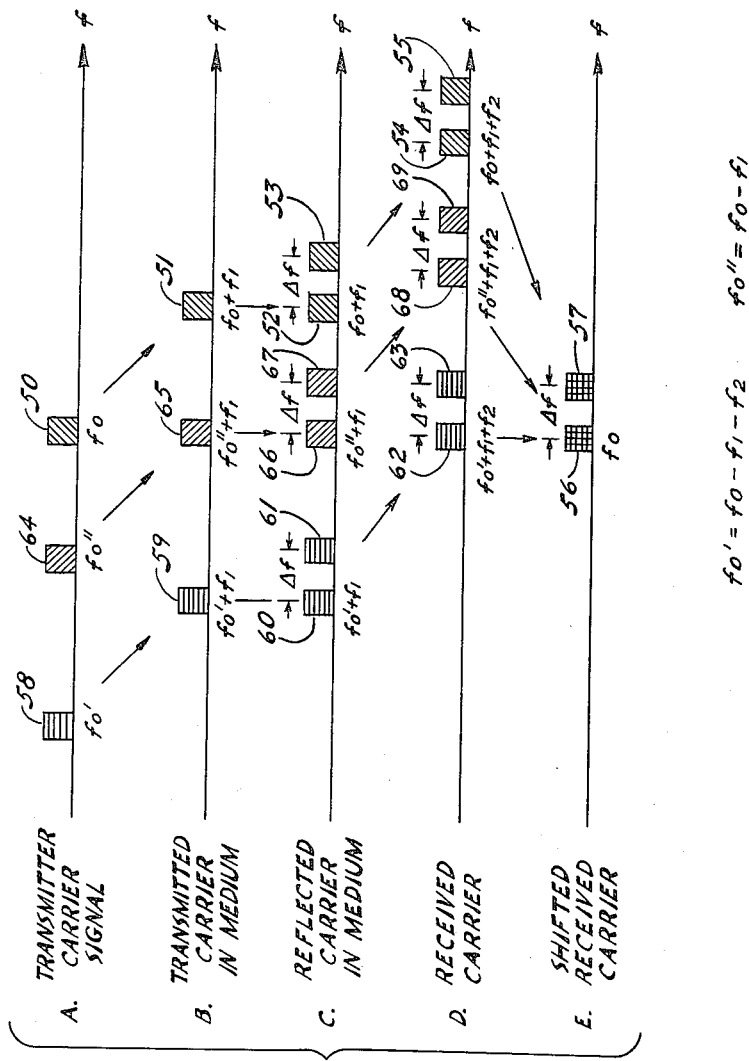

2,621,243

UNITED STATES PATENT OFFICE 2,621,243

MOVING TARGET INDICATION

David E. Sunstein, Cynwyd, Pa., assignor to Philco Corporation, Philadelphia, Pa., a corporation of Pennsylvania Application December 5, 1946, Serial No. 714,289

4 Claims. (Cl. 177—386)

This invention relates to object motion indicating systems. More specifically it relates to such systems of the reflection type in which there may be relative motion between an energy transmitter (which forms an essential part of the system) and the medium in which the energy is propagated to cause it to tranverse the space between the transmitter and target objects from which it is reflected. The invention is applicable to an object motion indicating system of the so-called storage type in which reflections from target objects are stored and subsequently compared with reflections later received from the same objects, whereby motion of certain of the objects in the interim is detectable. It also is applicable to systems of the non-storage type such, for example, as the one described in my copending application, Serial No. 694,297, filed August 31, 1946, in which motion of target objects is detected by noting alterations in the characteristics (i. e. frequency components) of pulses of oscillatory energy upon reflection from the objects. The invention is particularly applicable in such systems when the velocity of the transmitter, relative to the medium through which the transmitted energy is propagated, is of a magnitude such as to produce an appreciable difference in the frequencies of oscillations produced in the medium from those of the transmitter signals used to induce such oscillations. This may, for example, be the case in a system of the sort customarily used in the location of underwater objects. Such systems usually employ oscillations in the so-called supersonic range (i. e. from 10 to 100 kilocycles) to propagate, in water, waves whose velocity of propagation may be of the order of the velocity of sound in water. It is not unusual for the velocity of a vessel carrying transmitting equipment to be of the order of a percent or more of this velocity of propagation. Changes in the velocity of the transmitter with reference to the water will therefore produce substantial differences in the frequencies of the disturbances created in the water by the transmitter. These differences, in turn, will produce like differences in the characteristics of reflections of the propagated waves from objects in the water. By maintaining substantially constant the frequencies of the waves propagated in the water, these differences in the characteristics of reflections from objects can be minimized or substantially eliminated.

Under what are now regarded as normal conditions, this problem is not so serious in the case of radar and similar systems in which the velocity of propagation (i. e. of radio frequency waves in air) approaches the velocity of light. At the present time velocities of even the fastest aircraft will amount to but a very small fraction of a percent of the velocity of light. Hence the variation in the frequency of radio waves, owing to changes in velocity of an aircraft in which the transmitting equipment is situated, will, as a rule, be insignificant so far as their tendency to produce variations in the characteristics of reflections from moving objects is concerned. It is to be understood, however, that although the invention may not be needed under present conditions for radar purposes, it is equally applicable in principle to such systems, and might, for example, prove useful in aircraft or missiles whose velocities are exceedingly high.

Before proceeding with a detailed exposition of the invention it will be helpful to describe in outline certain typical systems of the sort to which it is applicable. There will first be considered an object motion indicator system of the so-called storage type above referred to. Such a system, whether for supersonic or radio frequency application, may comprise a transmitter of pulsed oscillatory energy adapted to effect the propagation in a medium, such as water or air, of waves whose frequencies will correspond in general to the frequencies of oscillations generated in the transmitter. Reflections of such waves from target objects are intercepted by a suitable receiver and stored until the receipt of subsequent reflections from the same objects produced in response to a subsequently transmitted energy pulse. If one of the objects is in motion relative to its surroundings, the frequency of energy reflected from it will differ from the transmitted frequency and this, in turn, will give rise to a difference in phase of successive reflections from the same object. These reflections beat either with the return from fixed objects or with the output of a local coherent oscillator in the receiver to produce pulses of differing amplitude in response to successive reflections from the moving object. The subsequently received reflections are compared in amplitude with the stored reflections from the same targets, and any difference noted will be indicative of the shift in frequency of the reflections produced by target motion. In order that successive reflections from a fixed target may not differ as to their characteristics and prevent distinguishing between moving and non-moving objects, some systems of this sort employ means for relating the phases of successive transmitted pulses. For this purpose there may be employed a so-called coherent oscillator, which oscillates continuously and which is used to determine the phase of each successive pulse of oscillatory energy generated by the transmitter.

The system just outlined constitutes an object motion indicator of the more conventional type. More recently it has been possible, as set forth in my aforementioned copending application, to provide a system by means of which motion of a target object can be detected from the characteristics of the reflection from the object of a single pulse of transmitted energy. Such a system possesses the advantage that it eliminates the need for a coherent oscillator and, as well, the need for means for storing a given reflection until a subsequent reflection from the same object is received for comparison with it. As set forth in my copending application above identified, there are transmitted pulses of energy comprising a relatively narrow band of frequency components. Reflections of such pulses from moving objects are found to contain frequency components outside the transmitted band, which components are produced either by Doppler or other effects. In the receiver the components thus resulting from reflection are separated from the transmitted components, for example, by means of a band-rejection filter having a rejection band coinciding with the band of transmitted frequencies. Thus the presence, in a received reflected pulse, of frequency components which are outside this band constitutes an indication that the target object, from which the reflection is received, is in motion.

Because of the advantages, under certain circumstances, of a system of the sort just referred to over systems of the storage type, I have chosen to describe the present invention as embodied in a system of the non-storage type.

A primary object of the invention is to provide an object motion indicator of the reflection type, in which the characteristics of reflections from objects are substantially independent of the velocity of a transmitter with reference to a medium in which waves are thereby propagated to produce said reflections.

Another object is to provide, in an object motion indicator of the reflection type, means for propagating waves in a medium by means of a transmitter located in a vehicle movable with reference to the medium and for maintaining certain characteristics of said waves substantially invariant despite changes in the velocity of the vehicle with reference to the medium.

Another object is to provide, in an object motion indicator of the reflection type, means, including a receiver located in a vehicle movable with reference to a medium, for transducing waves propagated in the medium so that at least certain of the characteristics of the waves thus transduced are maintained substantially invariant despite changes in the velocity of the vehicle with reference to the medium.

Still another object of the invention is to provide an object motion indicator system, comprising a transmitter and a receiver located in a vehicle movable with reference to a medium, for propagating waves in said medium and for receiving reflections of said waves from target objects in such a manner that at least certain characteristics of said received reflected waves are substantially independent of variations in the velocity of said vehicle with reference to said medium but vary in response to the motion of target objects producing them, whereby they are indicative of motion of said objects.

Other objects and advantages of the invention will become apparent from a consideration of the following description together with the accompanying drawings in which:

Figure 1 is a generalized diagram of a non-storage type target motion indicator according to the invention, and Figure 2 is an explanatory diagram.

Referring now to Figure 1, master oscillator and keyer 1 may be a source of time-spaced, pulse-modulated electrical oscillations at a carrier frequency $f_0$ in the supersonic range of from 10 to 100 kilocycles. As set forth in my aforementioned copending application, each pulse may comprise sideband frequency components which are of substantial magnitude only within a relatively narrow range (e. g. 150 cycles at a carrier frequency of 20 kilocycles). As hereinbefore mentioned, and as more fully set forth in my copending application, the restriction of the transmitted band in this manner makes readily possible the detection of components outside the band, which are produced by translation of the original components upon reflection from moving objects. The recurrence frequency of the pulses, as will be apparent from the subsequent description, determines the maximum range of object against which the system is operable. Thus, for example, if the system is to be used in seawater against targets at a maximum range of 2,000 yards, the pulse repetition period may be 2.5 seconds.

The pulsed oscillations from master oscillator and keyer 1 are supplied through connection 2 to a mixer 3. Also there is supplied to mixer 3, through connection 4 from a variable frequency oscillator 5, a signal whose frequency is controlled as will hereinafter be set forth and has a value $f_1$ at the time of occurrence of a pulse of energy from oscillator 1. The two signals are heterodyned, and from the resultant there is derived, by means of a filter which may form a part of the mixer, the difference frequency $f_0-f_1$ which is pulse modulated at the same rate as the signal $f_0$ from master osillator and keyer 1. These pulses are supplied through connection 6 to a power amplifier 7 and thence through connection 8 and T-R (transmit-receive) switch 9 to transducer 11. T-R switch 9 may comprise any suitable means, such as a commutator, which is controlled so as to connect transducer 11 to the output of power amplifier 7 during the occurrence of pulses therein which are to be transmitted, and at other times to connect transducer 11 to mixer 16 to permit the transfer of received pulses therebetween. Transducer 11, for the frequencies here exemplified, is preferably of the magnetostriction type. Transducers of this sort are well known in the art and need not be described in detail. Transducer 11, in response to the electrical pulses thus supplied to it, is adapted to propagate compression waves in the water which separates the transducer from various target objects, such as the one represented at 12. Depending upon the velocity of the ship in which the apparatus of Figure 1 is installed, the frequencies of the waves propagated in the water will differ from those of the oscillations supplied to transducer 11. For example, for a certain velocity of the ship with reference to the water, oscillations at the carrier frequency $f_0-f_1$ may result in the propagation of compression waves in the water at a carrier frequency $f_0$. These are transmitted through the water along broken line 13 to the target 12. If the target is in motion, there will be produced, in the waves reflected therefrom, component waves whose carrier frequency differs from that of the transmitted waves. Thus, for example, the reflected wave which returns along broken line 14 from target object 12 to transducer 11 may have a carrier frequency of $f_0+\Delta f$, where the magnitude and sign of $\Delta f$ depends on the speed and direction of travel of the target. Transducer 11 is also adapted to intercept these reflected waves and to convert them into electrical signals. These signals, if there is relative motion between the water and the vessel in which the equipment is situated, will comprise frequency components attributable to such motion in addition to those attributable to the components comprising the waves originally propagated. The carrier frequency of the received signal may, for example, be represented by the expression $f_0+f_2+\Delta f$. This expression takes into account the fact that the velocity relative to the water at the time of arrival of reflections at transducer 11 may differ from the relative velocity at the time of transmission. Such variation may, for example, be caused by a change in the forward velocity of the ship or by pitching or rolling thereof. At all times except during the transmission of pulses from power amplifier 7 to transducer 11 through connections 8 and 10, TR switch 9 may be adapted to supply received reflected signals from transducer 11 through connections 10 and 15 to mixer 16. The latter is also supplied, through connection 17 from another mixer 18, with signals whose frequency is equal to $f_3-f_2$. These signals, in turn, are obtained by mixing, in mixer 18, the signal from variable frequency oscillator 5, supplied to the mixer through connection 19, with a signal of fixed frequency $f_3$, supplied through connection 20 from local oscillator 21. For reasons which will later be pointed out, the frequency of the signal from oscillator 5 is $f_2$ at the time of arrival of a reflection from a target object. The mixer may include filter means for selecting the difference frequency $f_3-f_2$. This signal is supplied through connection 17 to mixer 16 where it is heterodyned with the signal supplied through connection 15, whose carrier frequency is $f_0+f_2+\Delta f$. The resultant difference signal has a carrier frequency of $f_0+f_3+\Delta f$. The effect thus produced is the same as if the incoming signal had first been shifted in frequency by an amount $f_2$ equal to the shift produced in reception by motion of the transducer relative to the water, and the resultant signal had then been beat with the local oscillator signal $f_3$ to yield a signal at a suitable intermediate frequency $f_0+f_3+\Delta f$. This intermediate frequency signal is supplied to an intermediate frequency amplifier 22, which may also be adapted to function as a band-rejection filter. It should be capable of rejecting the carrier frequency $f_0+f_3$ and sidebands thereof corresponding to those present in the pulse of energy originally transmitted, and which have not been shifted by reflection from a moving target. It should, however, pass the components of the transmitted signal which have been shifted owing to target motion. These components, as has already been noted, are indicative of target motion and may be supplied through connection 23 to any suitable and conventional form of indicator 24, to indicate the presence, in the water surrounding the vessel in which the equipment is located, of objects in motion relative thereto.

Transducer 11 is mounted for orientation about a pivot 25, and its orientation may be systematically controlled by means of a motor 26 through a mechanical linkage comprising crank 27, connecting rod 28 and lever arm 29 so as to cause it successively to propagate waves in different directions. To this end, the radiation characteristic of transducer 11 is preferably directional.

There is also provided a water speed indicator 30 which is adapted to indicate the instantaneous velocity of the vessel relative to the water in the direction in which the transducer 11 is oriented. To this end the orientation of indicator 30 may be controlled in synchronism with the orientation of transducer 11, likewise by means of motor 26, through the linkage comprising crank 27, connecting rod 28 and lever arm 31. The water speed indicator 30 may be relatively simple in form, comprising, as shown, a propeller 32 and an electrical generator 33 mechanically coupled to the propeller by means of pulleys 34 and 35 and belt 36.

As the speed of rotation of propeller 32 varies in response to variations in the speed of water past it, the output of generator 33 will vary. This output is supplied through connection 37 to variable frequency oscillator 5 to control its frequency. This controlling action may be made such that upon the occurrence of each pulse of oscillations at the carrier frequency $f_0$, the output of the variable frequency oscillator 5 will be of the required frequency $f_1$ to beat with the carrier frequency $f_0$ to yield pulsed oscillations at the frequency $f_0-f_1$, such as to maintain substantially constant the frequency $f_0$ of waves propagated in the water. Likewise, at the time of arrival of a reflection from a target object, the output of variable frequency oscillator 5 will be of the frequency $f_2$ necessary to eliminate, from the received signals, the frequency shift produced by motion of transducer 11 relative to the water. Thus, regardless of variations in the velocity of such motion, the resultant intermediate frequency signal $f_0+f_3+\Delta f$ will remain constant, and the frequency components therein corresponding to those in the transmitted signal can be substantially eliminated by means of a fixed band-rejection filter, which is here included in the intermediate frequency amplifier 22.

As already mentioned, it is essential for target motion detection purposes to maintain substantially constant the frequencies of waves propagated in a medium prior to their reflection from target objects. It will be apparent that the system of Figure 1 in accordance with the invention is adapted to achieve this result.

The principles of the invention and the mode of operation of the embodiment illustrated in Figure 1 will be more clearly understood by reference to the explanatory frequency diagram of Figure 2. Here the finite widths of the frequency bands are indicated, though not to scale, but no effort is made to indicate the relative magnitudes of the several frequency components within each band. At 50 is represented the band of frequencies generated by master oscillator and keyer 1 of Figure 1 and having a carrier frequency $f_0$. Were these signals to be supplied directly to the transducer 11 without modification by the action of mixer 3, the carrier frequency of the signals propagated in the water would be $f_0+f_1$ as represented at 51. Upon reflection from a fixed target object, no change in these signals would be produced, and the band of reflected components would be as represented at 52. However, if the target is moving toward the transmitter at a predetermined velocity, these components will be shifted in frequency by an amount $\Delta f$, as represented at 53. Upon arrival at the transducer, and depending upon the relative velocity between the transducer and the water at that time, there would occur a further shift in frequencies of reflections from both fixed and moving targets, which, for example, might be equal to $f_2$. The received components from a fixed target would then appear as represented at 54, while those for a moving target would appear as represented at 55. Either of these signals might be shifted downward in frequency by an amount $f_1+f_2$, in which event the resultant components for the fixed target would appear at 56 while those for a moving target would be displaced therefrom by an amount $\Delta f$, as represented at 57. The signals from moving targets could then be separated from those of fixed targets by means of a band-rejection filter centered at frequency $f_0$. Alternatively, of course, the receiver filter could be centered at the frequency $f_0+f_1+f_2$, in which event it would be unnecessary to effect a downward shift in frequency of the received signals. It will be noted however, in the mode of operation just described, that the band of frequencies propagated in the water would vary up and down in frequency from the position shown at 51 depending upon the relative velocity between the transducer and the water. This would result in undesired variations in the characteristics of reflections, which, as already pointed out, would render it difficult, if not impossible, to distinguish between fixed and moving targets. Thus, this mode of operation would be unsatisfactory except where the relative velocity between the transducer and the water remained substantially constant.

According to another mode of operation, the transmitter carrier, prior to transmission, might be shifted downward in frequency by an amount $f_1+f_2$ to yield a signal having a carrier located at $f_0'$ as represented at 58 in Figure 2. This presupposes that the velocity of the transducer relative to the water at the time of arrival of a reflection from a predetermined object could be predicted in advance in order to permit the determination of the magnitude of the frequency shift $f_2$. The carrier frequency of the signal propagated in the water would then be shifted upward by an amount $f_1$ as represented at 59. The reflections respectively from fixed and moving targets would occupy the bands 60 and 61. The received signals, for fixed and moving targets respectively, would be further shifted in frequency by an amount $f_2$ and would occupy bands 62 and 63. These signals could be supplied directly, and without need for further shifting, to the filter having a rejection band centered at frequency $f_0$. Again this mode of operation would be subject to the objection that the band of frequencies 59 occupied by the signals propagated in the water would move up and down depending upon the relative velocity between the transducer and the water.

According to the present invention, however, the signals at the transmitter are first shifted downward prior to transmission by an amount $f_1$, so as to cause them to occupy a band centered at frequency $f_0''$ as represented at 64. Frequency $f_1$ varies according to the relative velocity of the transducer with respect to the water, so that the band of frequencies occupied by the signals propagated in the water remains substantially fixed at the frequency $f_0$, as represented at 65. Upon reflection from a fixed target object, the band of reflected components will be unaltered in frequency as represented at 66. However, for moving targets the band will be shifted as represented at 67. In reception a further shift will occur for reflections from both fixed and moving targets whose respective bands will appear as shown at 68 and 69. Then, in accordance with the invention, the received signals are shifted by an amount $f_2$ which varies in accordance with the velocities of the transducer relative to the water, so that the resultant signals for a fixed target occupy the band 56 and may be eliminated by means of the band-rejection filter, while those for a moving target occupy the band 57 and are substantially unaffected by the band-rejection filter.

Thus it will be seen that, by shifting the frequency of the signal supplied to the transducer for transmission by an amount proportional to the relative velocity between the transmitter and the medium, the frequency of waves propagated in the medium can be maintained essentially constant, so as to avoid variations in the components produced in object-reflected waves. Furthermore, by shifting the received signals by an amount proportional to the relative velocity at the time of reception, the resultant signal may be maintained centered on the rejection band of a fixed filter adapted to eliminate the components corresponding to those originally transmitted and to select only those components which are indicative of target motion.

It may be reiterated, as will be apparent to those skilled in the art, that although the invention has been described with particuluar reference to a supersonic object detection system, in which it appears to have its maximum usefulness at the present time, it is equally applicable, though perhaps not as much needed, in systems operating at much higher frequencies— i. e. radar and the like. It will also be appreciated that the invention is susceptible of embodiment physically in forms other than the one here shown. Accordingly, the invention is to be regarded as subject only to the limitations imposed by the appended claims.

I claim:

1. An object motion indicating system for use in a vehicle movable with reference to a medium, said system comprising: a transducer responsive to signals applied thereto for propagating waves in said medium, means for supplying signals to said transducer, means for varying the frequency of signals supplied to said transducer as a function of the velocity of said vehicle with reference to said medium, a receiver of reflections of said propagated waves from target objects, means for controllably altering the frequencies of components of said received reflections as a function of the velocity of said vehicle with reference to said medium to maintain the frequencies of certain of said components within a predetermined frequency band, an indicator, and means for supplying to said indicator said altered frequency components of said reflections which lie outside said predetermined band, said last-named means comprising fixed frequency band rejection filter means constructed and arranged to reject frequency components within said predetermined frequency band.

2. An object motion indicating system for use in a vehicle movable with reference to a medium, said system comprising: means for propagating waves in said medium, means responsive to the velocity of said vehicle with reference to said medium for controlling said first named means to maintain the frequency of waves propagated in said medium substantially constant, a receiver of reflections of said propagated waves from target objects, means responsive to the velocity of said vehicle with reference to said medium for modifying said received reflections to eliminate substantially therefrom alterations in the frequencies thereof from the frequencies of reflected propagated waves in said medium occurring in the reception of said waves owing to motion of said vehicle with reference to said medium, an indicator, and means for supplying certain components of said modified received reflections to said indicator, said last-named means including fixed frequency band rejection filter means constructed and arranged to reject certain other components of said modified received reflections lying within a predetermined fixed frequency band.

3. In a wave transducing system for use in a vehicle movable with reference to a medium in which are propagated waves comprising frequency components lying both within and outside a predetermined first frequency band, means for transducing said propagated waves to produce other waves, means responsive to the velocity of said vehicle with reference to said medium for controllably altering the frequency components of said other waves to maintain within a predetermined second frequency band those components of said other waves which are produced in response to the components of said propagated waves lying within said first frequency band, a utilization device, and means for supplying to said utilization device said altered frequency components which lie outside said second frequency band, said last-named means comprising fixed frequency band rejection filter means constructed and arranged to reject frequency components within said second frequency band.

4. An object motion indicating system for use in a vehicle movable with reference to a medium, said system comprising: means in said vehicle for propagating waves in said medium, means responsive to the velocity of said vehicle with reference to said medium for controlling the frequencies of said waves to cause reflections thereof from moving target objects to comprise frequency componets which are distinguishable from the frequency components in reflections from target objects which are substantially fixed, means responsive to the velocity of said vehicle with reference to said medium for translating said first-named frequency components to frequencies within a predetermined frequency band and for translating said last-named frequency components to frequencies outside said band, an indicator, and means for supplying to said indicator said translated components which lie outside said predetermined frequency band, said last-named means comprising fixed frequency band rejection filter means constructed and arranged to reject frequency components within said predetermined frequency band.

DAVID E. SUNSTEIN.

REFERENCES CITED

The following references are of record in the file of this patent:

UNITED STATES PATENTS

| Number | Name | Date |
| --- | --- | --- |
| 1,204,826 | Schiessler | Nov. 14, 1916 |
| 1,528,210 | Hammond | Mar. 3, 1925 |
| 1,747,041 | Alexanderson | Feb. 11, 1930 |
| 1,801,466 | Townsend | Apr. 21, 1931 |
| 1,864,638 | Chilowsky | June 28, 1932 |
| 2,418,490 | Turner | Apr. 8, 1947 |
| 2,438,580 | Schuck | Mar. 30, 1948 |